United States Patent [19]

Byom

[11] Patent Number: 5,253,448
[45] Date of Patent: Oct. 19, 1993

[54] ADHESIVE RIBBON FOR CATCHING FLIES

[76] Inventor: Gilgyu Byom, 375-1, Dokchon 1 dong, Buk-ku, Pusan, Rep. of Korea

[21] Appl. No.: 960,552

[22] Filed: Oct. 13, 1992

[30] Foreign Application Priority Data

Mar. 17, 1992 [KR] Rep. of Korea .................. 92-4415

[51] Int. Cl.$^5$ .............................................. A01M 1/14
[52] U.S. Cl. ................................................. 43/114
[58] Field of Search .............................. 43/114, 115

[56] References Cited

U.S. PATENT DOCUMENTS

| 740,076 | 9/1903 | Baker | 43/114 |
| 919,149 | 4/1909 | Foster | 43/114 |
| 1,655,128 | 1/1928 | Berghorn | 43/114 |
| 3,816,956 | 6/1974 | Sekula | 43/114 |

FOREIGN PATENT DOCUMENTS

| 36070 | 1/1909 | Austria | 43/114 |
| 71927 | 6/1916 | Austria | 43/114 |
| 3137 | of 1894 | United Kingdom | 43/114 |
| 2058537 | 4/1981 | United Kingdom | 43/114 |

Primary Examiner—Kurt C. Rowan
Attorney, Agent, or Firm—Notaro & Michalos

[57] ABSTRACT

An adhesive ribbon for catching flies comprising:
  a band-shaped adhesive paper having two sides and an upper part and a lower part, the upper part having a groove thereon for folding the upper part and the upper part also having a vent therethrough;
  a floral design printed on each side of the paper;
  a transparent adhesive agent coated on both sides of the adhesive paper except for the upper part;
  a millboard attached to the lower part of the adhesive paper; and
  an oiled paper removably attached to both sides and the upper part of the adhesive paper.

4 Claims, 4 Drawing Sheets

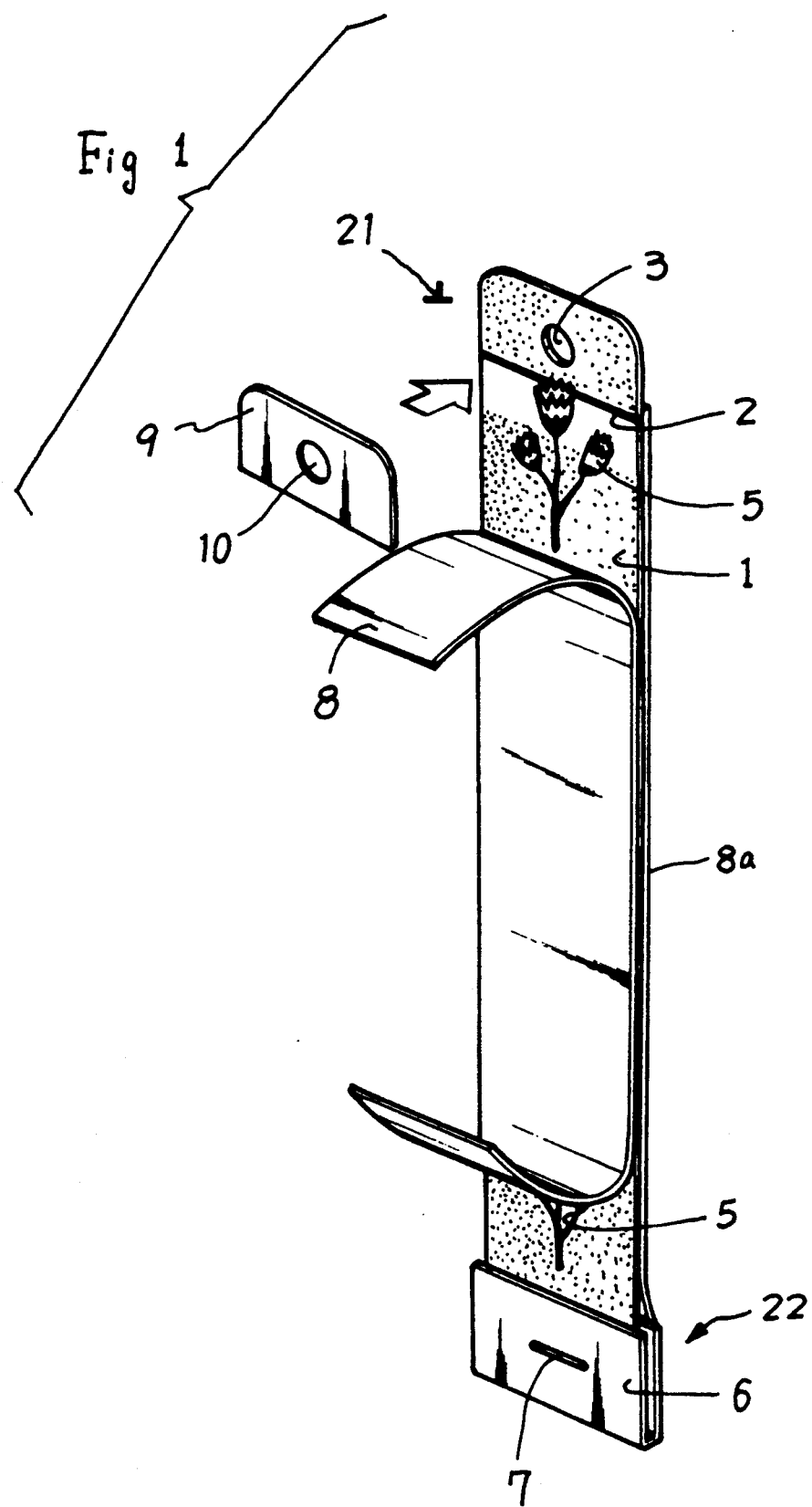

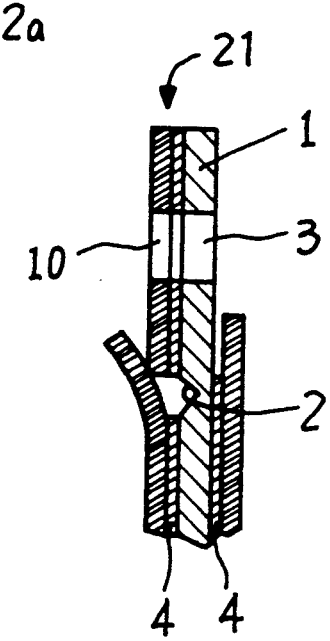
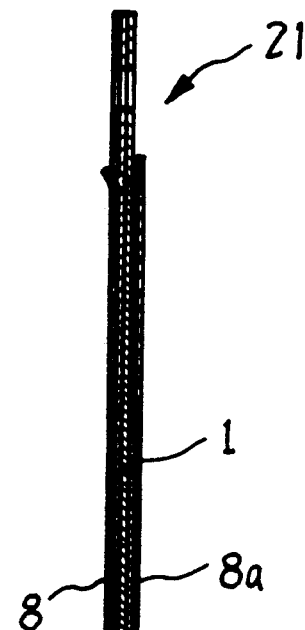
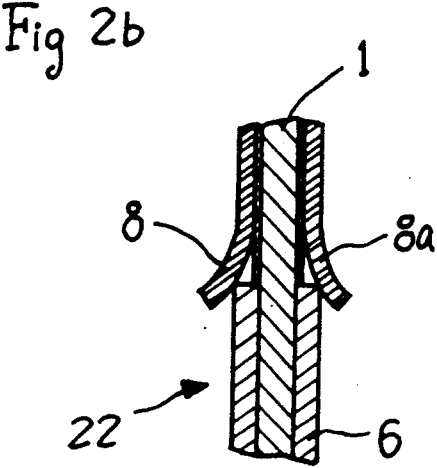
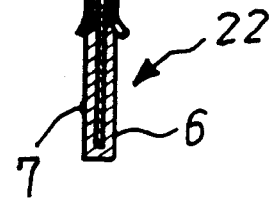

ADHESIVE RIBBON FOR CATCHING FLIES

FIELD AND BACKGROUND OF THE INVENTION

The present invention relates to an improved adhesive ribbon for catching flies which is excellent in usability, sanitary, economical to produce and aesthetically appealing.

FIG. 4 shows a conventional adhesive ribbon for catching flies 107 comprising an adhesive paper storing case 101, adhesive paper 102, supporting paper 103, a pressing needle 104, a pressing neddle supporting plate 105 and a hooking ring 106, which is complicated to manufacture, thereby making its manufacturing cost uneconomical. The use of it entails the trouble of holding the hooking ring 106 and pulling the adhesive paper 102 out of the storing case 101.

When it is used, its adhesive agent sticks to a finger, and so it is unpleasant and unsanitary.

Since the pressing needle 104 must be suspended by being driven into a ceiling 100 or a pillar, it is laborsome and inconvenient. The places where it can be suspended are limited and, therefore, not usable and practical. It is usable only in the place where it can be driven, for example, timber. Even though it is hung on a peg by using the hooking ring 106, the roughly attached hooking ring 106 fits so loose that it falls down easily. Even though it is hung on a peg, the pressing needle 104 which is lightly fixed on the adhesive paper 102 falls off easily.

When being removed after use, the pressing pin 104 is difficult to remove, so that it is inconvenient. The adhesive paper 102 is so apt to stick to the body making it unsanitary.

Since the color of adhesive paper 102 is cloudy brown, it is unpleasant to look at. As it does not present a feeling of cleanliness, its quality is regarded as low.

In the case where the pressing pin 104 is taken off and the adhesive paper 102 sticks to the floor and does not come off satisfactorily, the floor becomes dirty and looks unpleasant.

When using adhesive paper 102 that is not appealing, it results in a feeling of unpleasantness and a feeling of low quality.

Since the adhesive paper 102 must be made of durable craft paper, it is limited in usable material.

When used near a wall, the adhesive paper 102 is apt to stick to the wall so easily that it makes the wall dirty and unsanitary.

SUMMARY OF THE INVENTION

The present invention is an improved adhesive ribbon for catching flies which is excellent in usability, sanitary, economic to produce and aesthetically appealing.

BRIEF DESCRIPTION OF THE DRAWINGS

In the drawings,

FIG. 1 is a perspective view of the present invention having a separated a part, FIG. 2 is a vertical view in section of the present invention.

FIG. 2a is a sectional view of the upper part of the present invention;

FIG. 2b is a sectional view taken near the lower part of the present invention;

DESCRIPTION OF THE PREFERRED EMBODIMENT

Figure 3A:
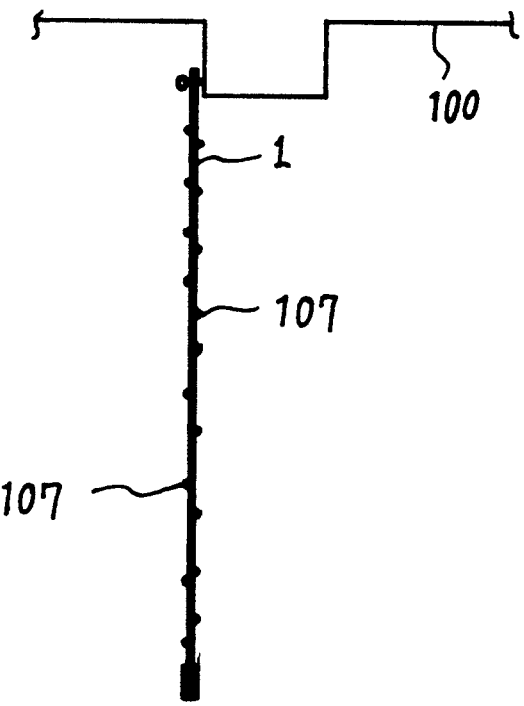
FIG. 3a is a side view of one mounting of the present invention.
Figure 3B:
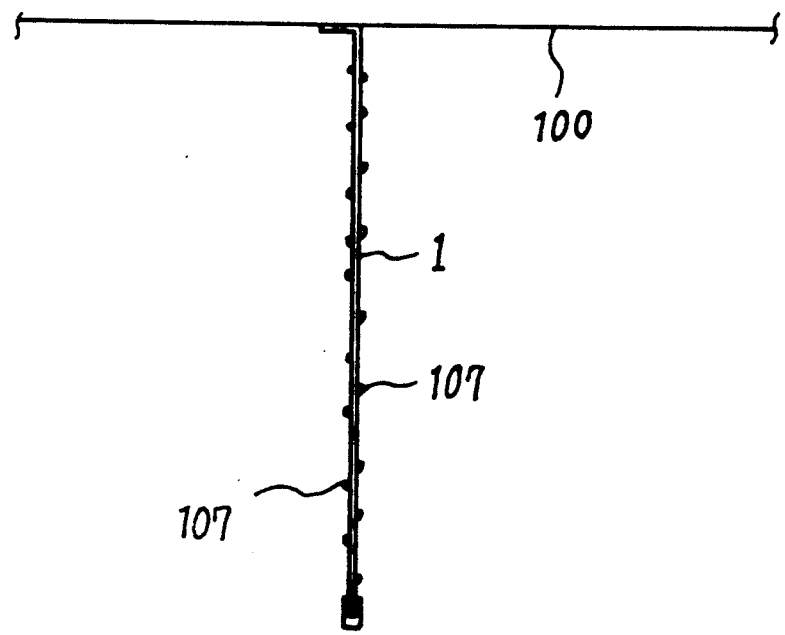
FIG. 3b is a side view of a second mounting of the present invention.
Figure 4:
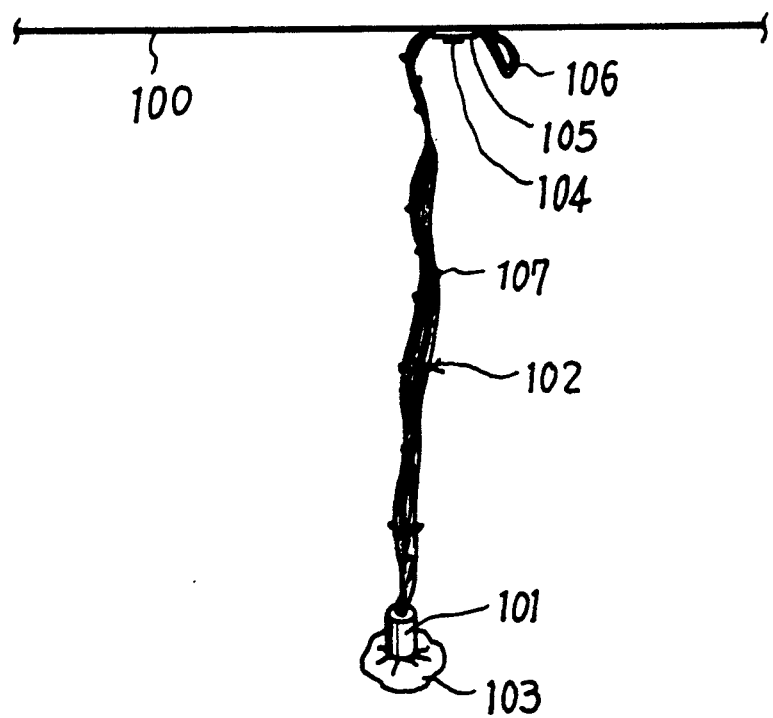
FIG. 4 is a perspective view showing a conventional product in use.

FIG. 1 shows that the present invention comprises an adhesive paper 1 having floral designs 5 printed and arranged on both surfaces of the band-shaped adhesive paper 1 having a white background. A vent 3 and a folding groove 2 are formed in an upper part 21 of the paper 1. A millboard 6 is attached to a lower part 22 of the paper 1 symmetrically and fixed by a fixing pin 7. FIG. 2 shows a transparent adhesive agent 4 coated on both surfaces of the paper 1 with the exception of the upper part 21. Oiled paper 8, 8a are attached to both surfaces of the paper 1. Oiled paper 9 has a vent 10 and is attached to the upper part 21. The vent 10 aligns with vent 3 of the upper part 21.

The present invention is economical by reason that general paper which is not limited in material is usable as adhesive paper 1.

It is convenient because it can be hung on a projection (for example, on a peg) or can be hung firmly by adhering to any object regardless of material used.

Because it is simple in construction, the manufacturing process is easy and economical.

It is excellent in usability because it is usable if and when oiled paper 8, 8a is removed.

Even when it is hung near a wall, if it is used without removing oiled paper 8a, the adhesive paper 1 does not stick to the wall, thereby making it sanitary.

Because paper 1 has a white background and a transparent adhesive agent 4, it looks clean and visual unpleasantness can be minimized.

Because beautiful floral designs are formed on the background of adhesive paper 1, a look of cleanliness is is emitted and marketability is thereby improved.

What is claimed is:

1. An adhesive ribbon for catching flies comprising:
   a band-shaped adhesive paper having two sides and an upper part and a lower part, the upper part having a groove thereon for folding the upper part and the upper part also having a vent therethrough;
   a floral design printed on each side of the paper;
   a transparent adhesive agent coated on both sides of the adhesive paper except for the upper part;
   a millboard attached to the lower part of the adhesive paper; and
   an oiled paper removably attached to both sides and the upper part of the adhesive paper.

2. The adhesive ribbon according to claim 1, wherein the band-shaped adhesive paper comprises a white background.

3. The adhesive ribbon according to claim 2, wherein the millboard is attached to the lower part of the adhesive paper by a fixing pin.

4. The adhesive ribbon according to claim 3, wherein the oiled paper removably attached to the upper part has a vent therethrough for alignment with the vent of the upper part.

* * * * *